Oct. 4, 1960     H. A. GEHRES     2,954,830
PROPELLER PITCH CONTROL MECHANISM
Filed May 27, 1954     9 Sheets-Sheet 1

INVENTOR.
Hewitt A. Gehres
BY
Ward, Neal, Haselton, Orme & McElhannon
Attys

Oct. 4, 1960 H. A. GEHRES 2,954,830
PROPELLER PITCH CONTROL MECHANISM
Filed May 27, 1954 9 Sheets-Sheet 3

INVENTOR.
Hewitt A. Gehres
BY
Ward, Neal, Haselton, Orme & McElhannon.
Attys

Oct. 4, 1960  H. A. GEHRES  2,954,830
PROPELLER PITCH CONTROL MECHANISM
Filed May 27, 1954  9 Sheets-Sheet 8

Fig. 16.

INVENTOR.
HEWITT A. GEHRES.
BY Ward, Neal, Haselton,
Orme & McElhannon
ATTORNEYS.

Oct. 4, 1960 H. A. GEHRES 2,954,830
PROPELLER PITCH CONTROL MECHANISM
Filed May 27, 1954 9 Sheets-Sheet 9

INVENTOR.
HEWITT A. GEHRES.
BY Ward, Neal, Haselton,
Orme & McElhannon
ATTORNEYS.

United States Patent Office 2,954,830
Patented Oct. 4, 1960

2,954,830
PROPELLER PITCH CONTROL MECHANISM

Hewitt A. Gehres, Mount Vernon, Ohio, assignor to Cooper-Bessemer Corporation, Mount Vernon, Ohio, a corporation of Ohio Filed May 27, 1954, Ser. No. 432,839

13 Claims. (Cl. 170—160.32)

In the use of aquatic propellers, it is sometimes desired to provide adjustment of the pitch of the propeller blades, so that they may be "feathered" to produce no propulsion in either direction, or adjusted to produce forward or reverse thrusts in varying degree, the propeller thus serving as a reversing mechanism, and also to maintain better efficiency under different speeds, loadings, etc. by appropriate adjustments of the pitch of the propeller blades to suit operating conditions and requirements.

This application is a continuation-in-part of application Serial No. 411,176, filed February 18, 1954 and now Patent No. 2,745,502.

In one of its aspects, the invention relates particularly to a pitch controlling mechanism appropriate for the above purposes, which is powered by fluid under pressure, one important object of the invention being to provide such a mechanism wherein power adequate for satisfactory operation, may be obtained without requiring the use of excessively high fluid pressure in operation. In another aspect the invention aims to provide such a mechanism wherein the turning moment which adjusts the pitch of each blade, will be so applied as to be substantially balanced with regard to the axis about which the pitch of the blade is adjusted, thereby largely relieving the mechanism of unbalanced friction producing forces and thrusts incident to adjustments of the pitch. In another aspect the invention aims to provide a control valve mechanism which is interconnected with and controls the pitch mechanism in such a manner that setting of the valve causes the pitch mechanism to change the pitch of the propeller blade by an amount determined by the setting of the valve and in the preferred embodiment of the invention the pitch to which the blade is set is independent of changes in the dimensions or positions of the parts which interconnect the propeller with its driving source, such changes, for example, being due to hydraulic pressure of the actuating fluid, backlash, thermal expansion or relative twisting or otherwise deforming of the parts under load. Further objects and advantages of the invention will be in part obvious and in part specifically referred to in the description hereinafter contained, which, taken in conjunction with the accompanying drawings, discloses a preferred form of propeller pitch controlling mechanism constructed to operate in accordance with the invention; the disclosure however should be considered as only illustrative of the invention in its broader aspects.

The invention is illustrated as applied to a rotary propeller shaft structure having hollow shaft sections 1 and 2 (Fig. 1) bolted together as indicated at 3, the hollow shaft section 2 having a circular flange 4 at its rearward end. A shell-like housing 5 for containing and driving the propeller blades and embodying the pitch adjusting mechanism is clamped to the flange 4 by bolts 6 (Fig. 1), the housing 5 being thus carried by the rotating with the propeller shaft structure.

An appropriate number of propeller blades 7 are to be understood as spaced around the periphery of the housing 5 and so mounted that each propeller blade is angularly adjustable with respect to the housing, about an axis directed substantially radially with respect to the axis about which the housing and propeller shaft structure conjointly rotate. Since the pitch adjusting mechanism may be similarly related to all of the blades, a description thereof as applied to one blade will serve for all.

Figure 1:
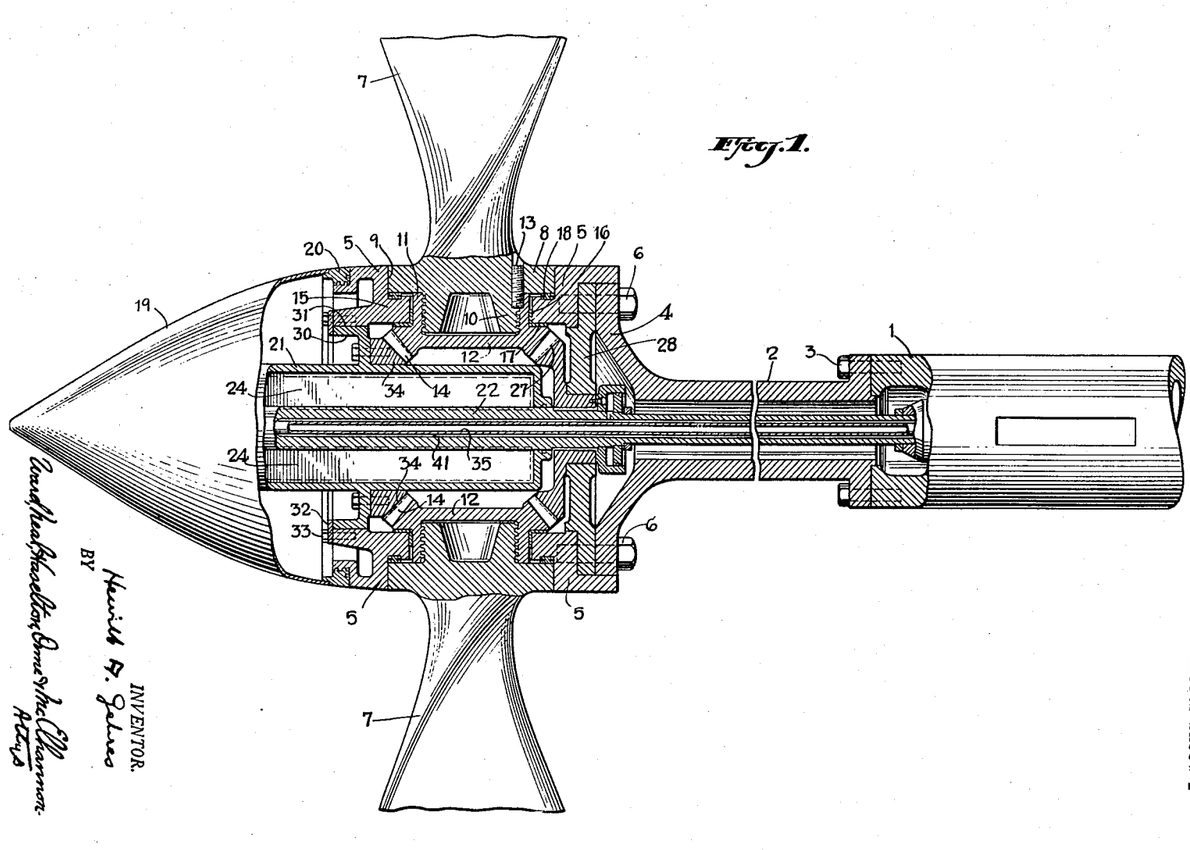
Fig. 1 is a central longitudinal sectional view of a propeller pitch controlling mechanism embodying the invention.

As shown in Fig. 1, the base flange 8 of a propeller blade may be received in a peripheral circular recess 9 in the housing 5, the blade being shown as having a threaded hub 10 using an interrupted or breech lock type of thread which engages within a threaded portion 11 of the pitch adjusting member 12. The propeller blade 7 and its adjusting member 12 are thus detachably held together, and they may be locked against accidental loosening by a threaded pin 13 which penetrates into the joint between them.

The pitch adjusting member 12 is shown in the form of a bevel gear having teeth 14 (Fig. 1) located inwardly of a circular seat 15 in the housing 5, which acts as a bearing for the propeller blade and the gear 12 during adjustment of the pitch, liner rings for this bearing being provided as indicated at 16 and 17, and also a sealing ring as indicated at 18 to prevent water from entering into the interior of the housing through the joint at the bearing. A conical shell 19 carried by a threaded ring 20, may also be mounted at the outboard end of the housing 5 to enclose and seal off the space within the housing from surrounding water.

Figure 2:
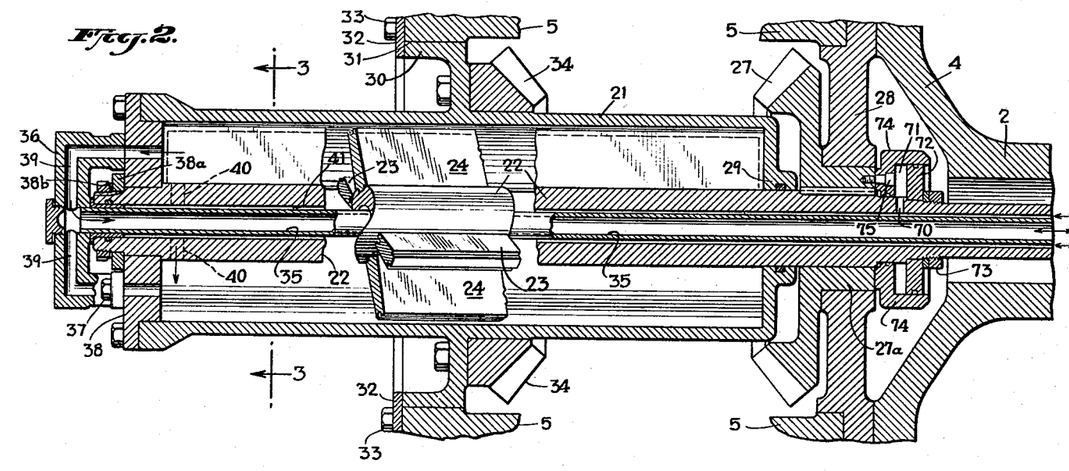
Fig. 2 is a detail longitudinal section taken through certain of the main operating parts of the mechanism shown in Fig. 1, and with such parts shown somewhat enlarged.
Figure 3:
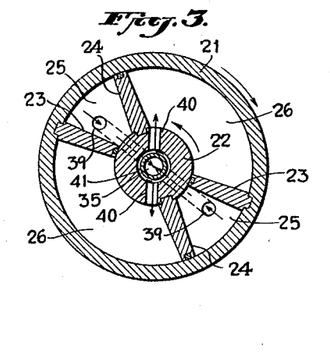
Figs. 3, 4 and 5 are sections taken on the line 3—3 of Fig. 1, but showing certain of the working parts of the mechanism in different operating relationships.
Figure 4:
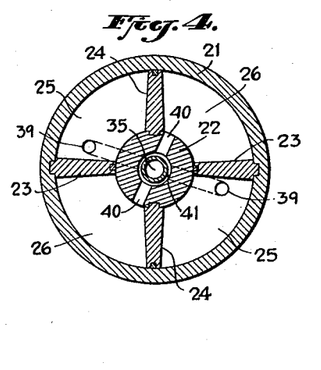
Figure 5:
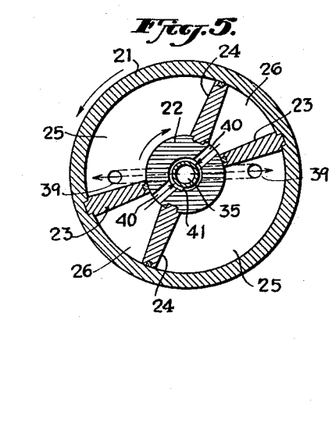

To supply power for adjusting the pitch of the blades, I provide a chamber or chambers within the housing 5, to and from which fluid under pressure is conducted. In the illustrated form of the invention, fluid under pressure is received in the annular space between a cylinder 21 located substantially centrally within the housing 5 and extending longitudinally of the propeller shaft structure, and a hollow shaft 22 running centrally through cylinder 21. Vane members 23 (Figs. 3–5) carried by the cylinder 21 and vane members 24 carried by the hollow shaft 22, are shown as partitioning the annular space between the cylinder 21 and the hollow shaft 22, so as to divide this space into a plurality of sub-chambers 25, 25 and 26, 26, as indicated in Figs. 3–5. The shaft 22 has splined to one end thereof as indicated in Fig. 2, a bevel gear member 27, which latter is journaled in a web 28 clamped between the flange 4 and housing 5. Thus the hollow shaft 22 and the gear 27 fixed thereto may move angularly with respect to the propeller shaft structure and housing 5, about the axis of rotation of the propeller shaft structure and the housing 5.

The cylinder 21 is likewise mounted so that it may move angularly about the last mentioned axis, with respect both to the housing 5 and the shaft 22. As shown in Fig. 2, a hub 29 mounts the forward end of the cylinder 21 for turning with respect to the shaft 22, and the cylinder 21 is also provided with a cylindrical flange 30 which is journaled within a seat 31 in the housing 5, so as to allow the cylinder 21 to move angularly within and with respect to the housing 5. A retaining ring 32 (Fig. 2), held in place by bolts 33, may be provided to hold the cylinder 21 rotatably in position, and a bevel gear 34 fixed to cylinder 21, engages the bevel gear 14 which is fixed to the propeller blade 7.

With the parts thus coordinated, if fluid such as oil under pressure be admitted for example to the chambers 26, 26, as the parts appear in Fig. 3, while the chambers 25, 25 are connected to exhaust ports, so that fluid may pass out of these chambers, the sets of vanes 23 and 24 will cause the cylinder 21 to move angularly in one direction, and the hollow shaft 22 to move angularly in the other direction, as indicated respectively by the arcuate arrows in Fig. 3. This angular movement of the members 21 and 22 with respect to each other and also with respect to the propeller shaft structure and the housing 5, will turn the gear members 27 and 34 in opposite directions, and since these gears engage the gear 12 at points spaced substantially diametrically with respect to the axis of gear 12, which is the axis about which the pitch of the propeller is adjusted, the pitch adjustment will be effected by the application of forces which produce a substantially balanced torque. The bearings of the propeller blades accordingly are relieved of high frictional forces which otherwise would be set up during adjustment.

In the form of the invention under discussion, fluid under pressure may be supplied to or withdrawn from the chambers 25, through a central tube 35 (Fig. 2) which passes through the hollow shaft 22, and is fastened at its rearward end to a fitting 36 (Fig. 2) clamped by bolts 37 to the adjacent end wall 38 of cylinder 21, the fitting 36 having passageways 39 which communicate respectively with the chambers 25. The rearward end of the shaft 22 is journaled in the wall 38, and a ring 38a (Fig. 2), held in position by a nut 38b, holds the shaft 22 against endwise movement with respect to wall 38.

The hollow shaft 22 is shown as provided with ducts 40 (Fig. 2) which respectively connect the chambers 26, 26 with an annular fluid passageway 41 located between the hollow shaft 22 and the tube 35. Thus if fluid under pressure is admitted through tube 35 to the chambers 25, while the chambers 26 are connected through ducts 40 to the passageway 41 through which operating fluid is being drawn off, the relative turning movements of the cylinder 21 and hollow shaft 22 will be as indicated by the arcuate arrows in Fig. 5. On the contrary, if fluid under pressure be admitted through the passageway 41 and ducts 40 to chambers 26, 26, while fluid is being drawn off from chambers 25 through passages 39 and tube 35, the relative turning movements of the cylinder 21 and hollow shaft 22 will be in the opposite direction as indicated by the arcuate arrows in Fig. 3. The direction of angular movement indicated in Fig. 3 may be that obtaining, for example, when the forward thrust of the propeller is to be increased, while the direction as indicated in Fig. 5 may be that obtaining when the pitch is to be adjusted to decrease the forward thrust of the propellers, or adjust the latter to produce a reverse thrust. The position of Fig. 4 may be understood to be that obtaining when the propellers are "feathered" so as to idle with little or no thrust in either direction during rotation of the propeller shaft structure.

A pitch adjusting mechanism of the above character makes it possible to apply the relatively large amount of power needed to adjust the pitch of the blades, without requiring excessively high hydraulic pressure in operation. Power available for pitch adjustment will depend upon the fluid pressure and the effective area of the vanes 23, 24 exposed to this pressure. While the vanes and associated elements are necessarily limited in respect to their extent radially of the propeller, the cylinder 21 and associated vanes may be readily extended longitudinally of the propeller shaft structure, as needed to increase their effective area. In actual practice, the hydraulic pressure needed to operate the mechanism may readily be kept down by longitudinally extending the parts as above mentioned, to about one quarter of the pressure which otherwise would be required by a circular piston type which could be mounted in an equivalent cross section.

It should be noted that the gear members 27 and 34 which transmit the relative angular movements of the vanes 23, 24 to the pitch adjusting gear 14, respectively engage the gear 14 at diametrically opposite points, i.e., at points located respectively forwardly and rearwardly of the axis of the propeller blade 7, about which axis the pitch of the blade is adjusted. During adjustment of the pitch, the gears 34 and 27 will move angularly in opposite directions to apply equal turning moments to gear 14, thereby applying pitch adjusting forces to the propeller blade which are substantially balanced about its axis of adjustment. In this way, the bearing surfaces at the base of the propeller blade are largely relieved of unbalanced friction producing stresses which otherwise would be set up during adjustment of the pitch.

Figure 6:
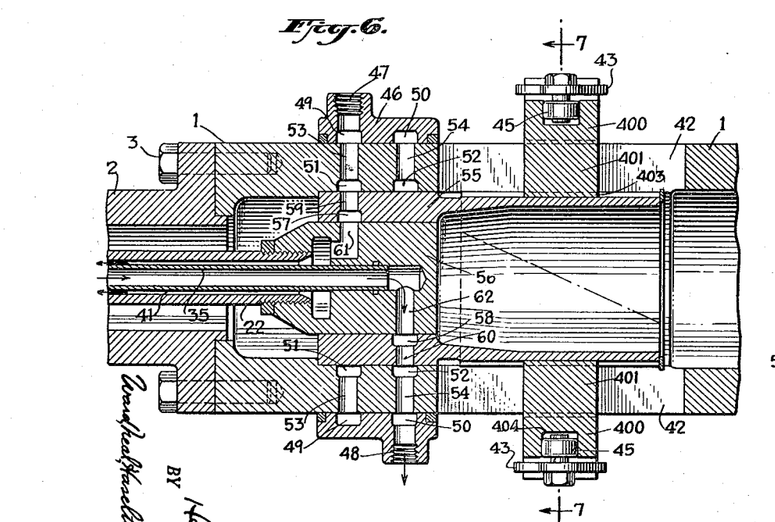
Fig. 6 is a longitudinal section, somewhat enlarged of the parts of the mechanism which appear at the right of Fig. 1.
Figure 7:
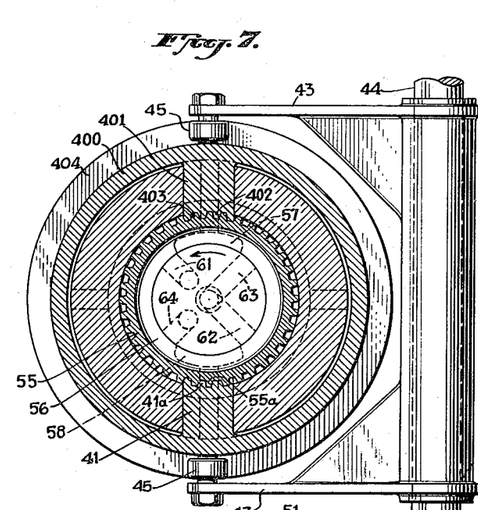
Fig. 7 is a section on line 7—7 of Fig. 6.
Figure 8:
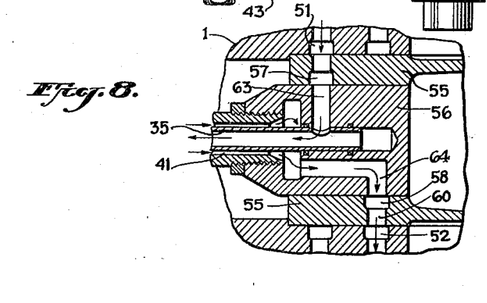
Fig. 8 is a view similar to the central portion of Fig. 6, but showing the parts in different operational relationship.

In Figs. 6–8, I have shown one form of pilot valve apparatus which may be used to control the setting and operation of the pitch adjusting mechanism, this particular form of apparatus being referred to only by way of example. In Fig. 6, the propeller shaft section 1 is shown as having rotatably and slidably mounted thereon, a ring 400 provided with lugs 401 which project inwardly through diametrically opposed slots 42 (Fig. 6) in the hollow shaft section 1. In this form of apparatus, the pitch at which the adjusting mechanism sets the propeller blades, depends upon the position of the ring 400 longitudinally of the shaft section 1, and for the purpose of controlling and adjusting this longitudinal position, I have shown in Fig. 7 a lever member having arms 43 which are angularly adjustable about the axis of a shaft 44, and are provided with rollers 45 which engage in a peripheral groove 404 in ring 400. Thus this lever may be adjusted to move the ring 400 to and hold the ring in various positions longitudinally of shaft section 1.

The shaft section 1 is shown in Fig. 6 as enclosed by a stationary collar 46, to which a supply line for admitting oil under pressure may be connected at the fitting 47, and to which an offtake pipe for oil under pressure may be connected at the fitting 48. These fittings 47 and 48 communicate respectively with annular channels 49 and 50 in the inner surface of the collar 46, such channels in turn being respectively in communication with annular channels 51 and 52 in the inner surface of the shaft section 1, respectively through ducts 53 and 54.

A sleeve member 55 is mounted to move angularly within and with respect to the shaft section 1, a pilot valve member 56 being enclosed by the sleeve 55, and this pilot valve member being attached to the inner end of the shaft member 22 previously mentioned, so as to turn with the latter. The inner end of the tube 35 previously mentioned engages rotatably within the pilot valve member 56.

The inner surface of the sleeve member 55 is provided with arcuate channels 57 and 58 (Figs. 6 and 7) which are in communication respectively with the annular channels 51 and 52 through ducts 59 and 60 (Fig. 6). The angular position or setting of the sleeve 55 with respect to the shaft section 1 is determined by the setting of the ring 400—longitudinally of the shaft section 1. As shown, the lugs 401 of ring 400 have spiral teeth 402 (Fig. 7) which engage with spiral teeth 403 on the outer surface of the sleeve 55, so as to twist the sleeve 55 more or less in one direction or the other with respect to the shaft section 1, as ring 400 is shifted in one direction or the other along the shaft section 1.

The pilot valve member 56 is shown as having a duct 61 which in the position shown in Fig. 6, affords communication from the fluid intake fitting 47 through the channels 49, 51 and 57, to the annular passageway 41 surrounding the central tube 35 previously referred to, thereby admitting fluid under pressure to the chambers 26 through the passages 40 as indicated in Fig. 3. In the same setting of the parts, as indicated in Fig. 6, a duct 62 in the pilot valve member 56 connects the interior of the tube 35 to the fluid offtake fitting 48, whereby fluid under pressure may flow out from the chambers 25 as indicated in Fig. 3. So long as the setting of the ring 400 remains the same, the above flow of operating fluid under pressure will continue until the shaft 22 and valve member 56 have twisted sufficiently with respect to the enclosing sleeve 55, to shut off the further flow of operating fluid through the pilot valve member 56. Fig. 7 shows such an angular setting of the parts, wherein the arcuate passage 57 no longer communicates with the duct 61 and the arcuate channel 58 no longer communicates with the duct 62. Fig. 8 indicates a reverse setting of the sleeve 55 with respect to the shaft section 1 and pilot valve member 56, wherein the annular channel 51 through which incoming operating liquid flows, is connected through the arcuate channel 57 to a duct 63 (Fig. 8) in the pilot valve member 56, which duct communicates with the interior of the tube 35. Thereby operating fluid under pressure is admitted into tube 35 and into the chambers 25, 25 as indicated in Fig. 5. At the same time, a duct 64 (Fig. 8) in the pilot valve member 56 places the annular passageway 41 in communication with the arcuate channel 58 of sleeve 55, and thence through the duct 60 to the annular channel 52 in the shaft section 1, which latter is in communication with the offtake fitting 48 for fluid under pressure. The resulting adjustment of pitch of the propeller blades will continue until the pilot valve member 56 moves far enough angularly with respect to sleeve 55, to shut off the further flow of operating fluid as indicated in Fig. 7. In other words, once the pitch adjustment has been made, so long as the setting of the ring 400 remains the same, the parts of the pitch adjusting mechanism remain stationary with respect to each other; but whenever the longitudinal position of the ring 400 is altered in either direction, the pitch of the propeller blades is proportionately increased or decreased as determined by the new position to which the ring is shifted.

In operation, the gears 27 and 34 will be in driving relation to the pitch adjusting gears 14 of all of the propeller blades, such blades and their adjusting gears being spaced equally around the periphery of the housing 5, and the gears 27 and 34 serving to simultaneously adjust the pitch of each propeller blade in like manner. Preferably means is provided to urge the gears 27 and 34 toward the gears 14 interposed therebetween, to eliminate backlash or looseness of engagement between the gears. As shown in Fig. 2, fluid under pressure in the passageway 41 may enter through a duct 70 into chamber 71 which surrounds the shaft 22 and is interposed between a disc 72 clamped by a nut 73 to the shaft 22, and a cup-like member 74, clamped by screws 75 to the adjacent face of the hub 27a of gear 27. The fluid under pressure in the chamber 71 urges the members 72 and 74 apart, longitudinally of shaft 22. This pressure is transmitted through shaft 22, and wall 38 and cylinder 21 to urge the gear 34 to move to the right as the parts appear in Fig. 2, i.e., into tighter engagement with the pitch adjusting gears 12 which are located to the right thereof. And in like manner, the fluid pressure in chamber 71 is transmitted through cup member 74 and the hub 27a to urge the gear member 27 toward the left as the parts appear in Fig. 2, i.e., into tighter engagement with the adjacent teeth of the pitch adjusting gears 12. In other words, the pressure in chamber 71 urges the gear 27 to move rearwardly of the propeller shaft structure, and urges the gear 34 to move forwardly of the propeller shaft structure, thereby to hold the pitch adjusting gears more tightly in engagement with both of the gears 27 and 34.

In the preceding embodiment of the invention, the blades are turned by means of a gear member 12 which is driven by a pair of gears 27 and 34. With such an arrangement, there is substantially only line contact between the surfaces of the gear teeth which transmit the force of the cylinder 21 and shaft 22 to the member 12 for changing the pitch of the blade. To increase the area of contact and thus to improve the operation, the arrangement shown in Figs. 9–11 may be employed.

Referring to these figures, the parts therein which are the same as the parts shown in the preceding figures, have the same reference numerals. However, in these figures the gear drive is replaced by pins having rounded or ball ends which are engaged and driven by sockets, thus distributing the pitch changing force over a relatively large area. As shown most clearly in Fig. 9, the threaded hub 10 engages a threaded collar 80 extending outwardly from a pitch adjusting member 81. The propeller blade 7 and its adjusting member 81 are thus detachably held together and they may be locked against accidental loosening by a threaded pin 13 which acts as a set screw.

Figure 10:
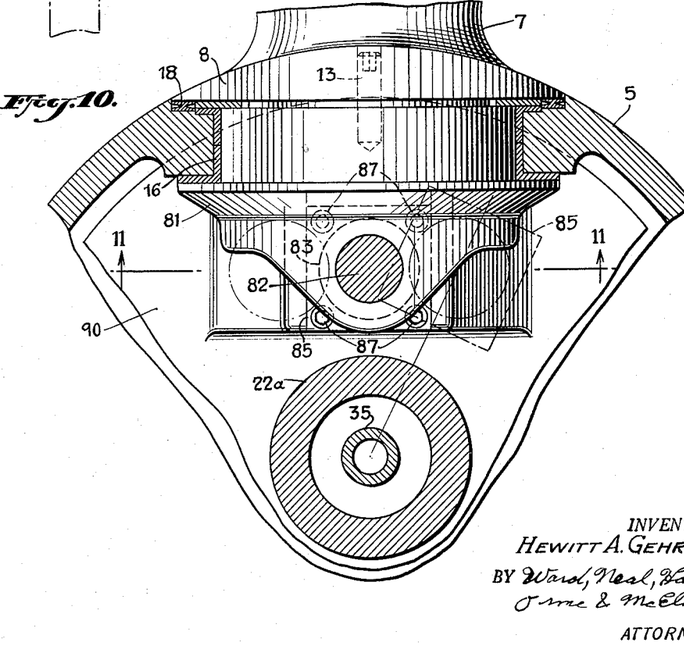
Fig. 10 is a fragmentary sectional view of the embodiment in Fig. 9 and is taken along the line 10—10 indicated in Fig. 9.
Figure 11:
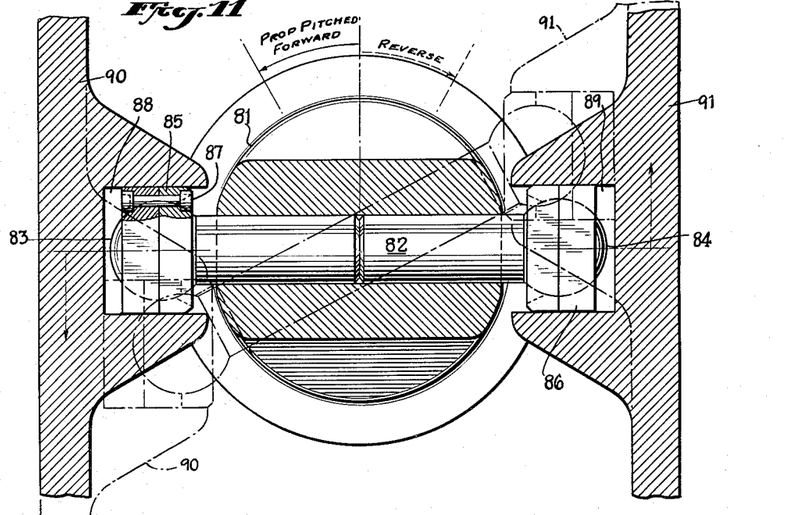
Fig. 11 is a fragmentary sectional view of the embodiment shown in Figs. 9 and 10 and is taken along the line 11—11 indicated in Fig. 10.

The pitch adjusting member 81 has a radial hole therethrough and a pin 82 having a pair of rounded or ball ends 83 and 84 extends through this hole. If desired, additional radial holes may be provided to permit proper positioning of pin 82 regardless of the position of the member 81 when it is assembled with blade 7 and blade 7 assumes its neutral position. The ends 83 and 84 are gripped by a pair of socket members 85 and 86 which are divided into two halves and held together by bolts 87 as shown in Figs. 10 and 11. The socket members 85 and 86 are sufficiently loose with respect to the ends 83 and 84 to permit the socket members 85 and 86 to move with respect to the ends 83 and 84 as the member 81 is rotated in the manner hereinafter described.

Figure 9:
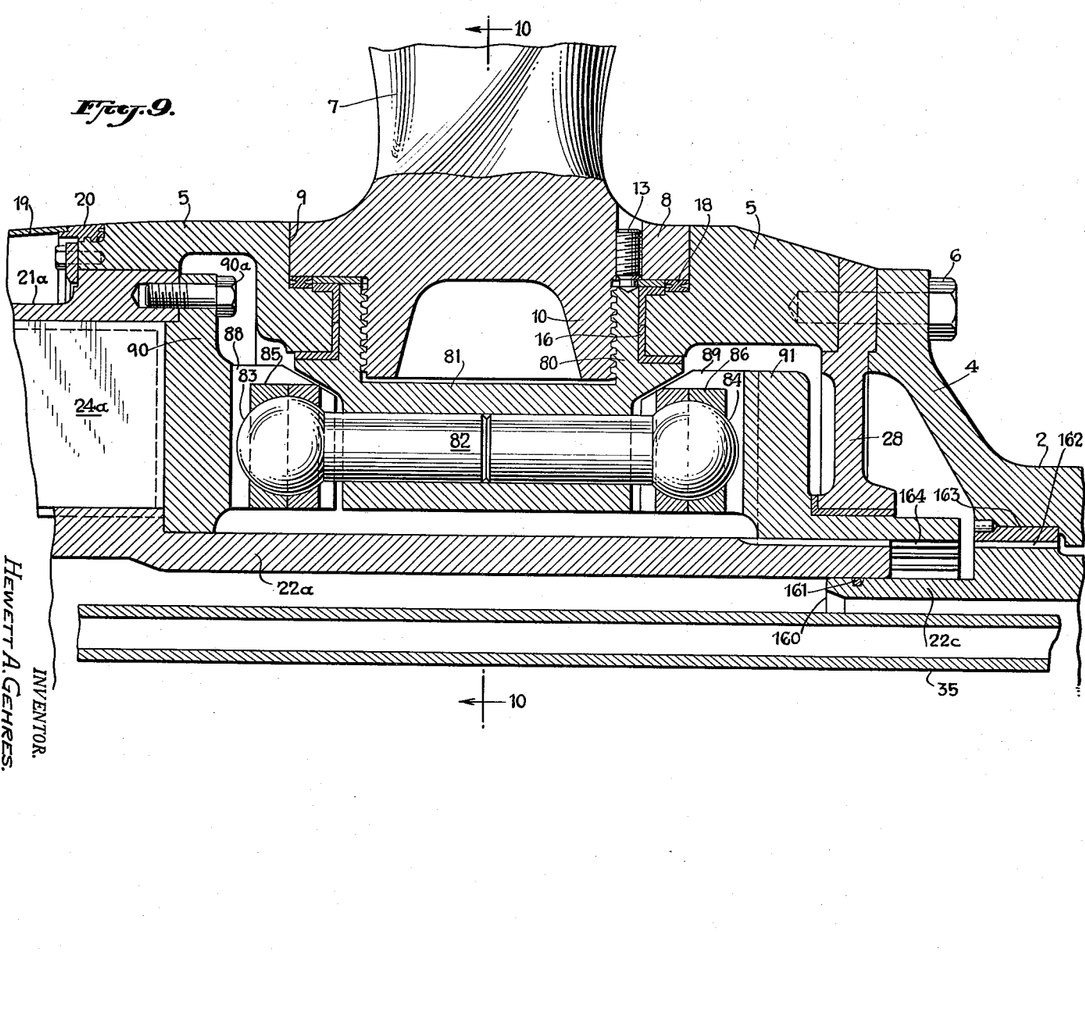
Fig. 9 is a longitudinal section of a further embodiment of a propeller pitch controlling mechanism embodying the invention.

The outside of the socket members 85 and 86 has the shape of a square or rectangle and they fit slidably into slots 88 and 89 in the end members or collars 90 and 91, the end member 90 being driven by the cylinder 21a and the end member 91 being driven by the shaft 22a. The cylinder 21a and the shaft 22a are driven in the manner described above in connection with Figs. 1–8 and the shaft 22a and the cylinder 21a may be disposed below the pitch adjusting member 81 in the same manner as they are disposed in Figs. 1–5. However, as shown in Fig. 9, the cylinder 21a is disposed rearwardly of the pitch adjusting member 81, and the end member 90 is secured to the end of cylinder 21a by bolts 90a. The vanes 24a which rotate with the shaft 22a are disposed rearwardly of the end member 90 and within the cylinder 21a. The end member 91 is connected by a spline to the shaft 22a causing it to rotate with the shaft 22a.

Accordingly, the end member 90 is driven in one direction and the end member 91 is driven in the opposite direction when fluid under pressure is supplied to the cylinder 21a in the manner described in connection with Figs. 1–5. As a result the end member 90 moves the end 83 in one direction whereas end member 91 moves the end 84 in the opposite direction causing rotation of the adjusting member 81 and, hence, rotation of the blade 7. Since socket members 85 and 86 are free to turn with respect to the ends 83 and 84 and since they are mounted in slots 88 and 89, they are free to move in both a radial direction and an axial direction with respect to the end members 90 and 91 as these latter members turn. Thus, as shown in Fig. 10, the centers of the socket members 85 and 86 move in a straight line following the paths of movement of the ends 83 and 84. In addition, the socket members tilt and move axially and radially as the end members 90 and 91 rotate.

Referring to Fig. 11, the position of the pin 82 shown in solid lines corresponds to its position shown in Fig. 9. However, when the end members 90 and 91 rotate as above described, the pin 82, as well as the other parts associated therewith, move to the positions shown in dotted lines in Fig. 11. It will be noted that in changing the pitch of the propeller blade, it is not necessary to provide full 360 degree rotation and, instead, only rotation through a small angle on each side of a central position is required. It is for this reason that the ball and socket type of connection shown in Figs. 9–11 may be employed in place of the gear drive shown in Figs. 1 and 2.

The shaft 22a may extend directly to the pilot valve apparatus in the same way that shaft 22 extends thereto, but for reasons set forth hereinafter the shaft 22a is connected to the pilot valve apparatus through an intermediate shaft 22c whose end 160 fits slidably and rotatably within the shaft 22a, a fluid-tight connection being provided by means of sealing ring 161. The shaft 22c normally is in the position shown in Fig. 9 and spline teeth 162 engage mating teeth 163 on the inner wall of shaft 2 causing shaft 22c to rotate with shaft 2. However, if for some reason it is desired to control the pitch manually, shaft 22c is slid axially from the position shown in Fig. 9 toward shaft 22a causing the teeth 162 to become disengaged from the teeth 163 and to engage teeth 164 on end member 91. In this position, shaft 22c may be rotated with respect to shaft 2, and if the pitch control mechanism is not subjected to hydraulic pressure the shaft 22c may be rotated by means hereinafter described to cause rotation of member 91 and hence to cause the pitch of blade 7 to change.

With the pilot valve arrangement shown in Figs. 6–8, it is possible for longitudinal motion of shaft 2 due to backlash in its associated bearings or for changes during operation in length of the parts which connect the pilot valve to the cylinder 21a and to the shaft 22 to cause the pitch of the propeller blades to change, and hence the pitch of the blades might not be exactly that which is indicated at the control mechanism which operates the pilot valve, such control mechanism being in the pilot house, for example. It is highly desirable that the pitch be accurately related to the setting of the control mechanism and remain at the value to which it is set by such control mechanism. Therefore, in the preferred embodiment of the invention, the pilot valve and control mechanism arrangement shown in Figs. 12–15 is employed in place of the pilot valve and control mechanism shown in Figs. 1–8.

Figures 12, 14, 15:
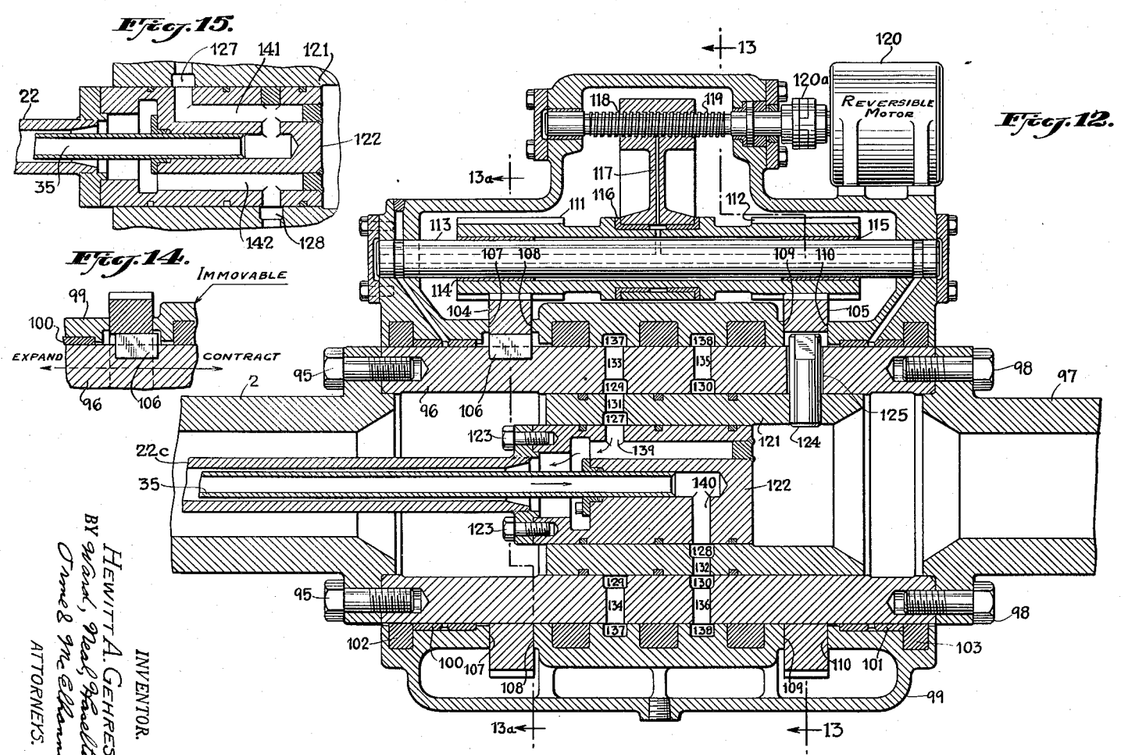
Fig. 12 is a longitudinal section of a further embodiment of the pilot valve apparatus which may be used to control the pitch adjusting mechanism.
Fig. 14 is a sectional view of a portion of the apparatus shown in Fig. 12.
Fig. 15 is a reduced, longitudinal, partial section of the apparatus shown in Fig. 12 and illustrates the working parts of the apparatus in different operational relationship.
Figure 13:
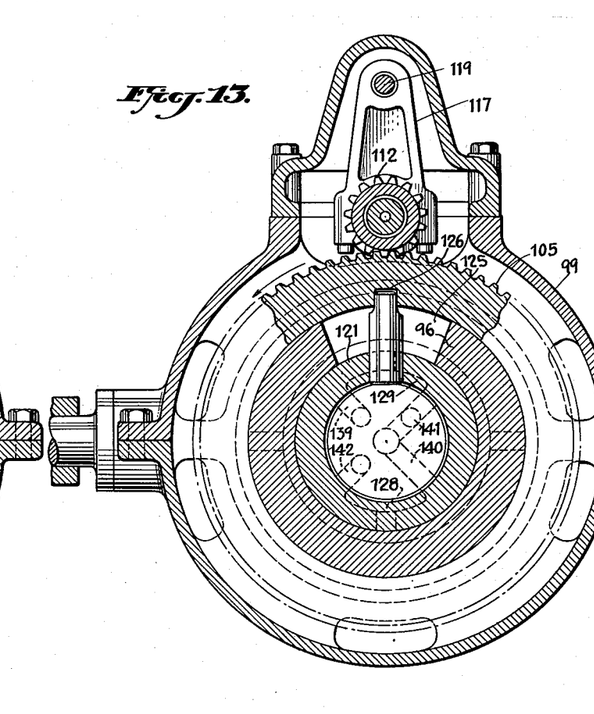
Figs. 13 and 13a are sectional views of the apparatus shown in Fig. 12 and are taken respectively along the lines 13—13 and 13a—13a indicated in Fig. 12.
Figure 13A:
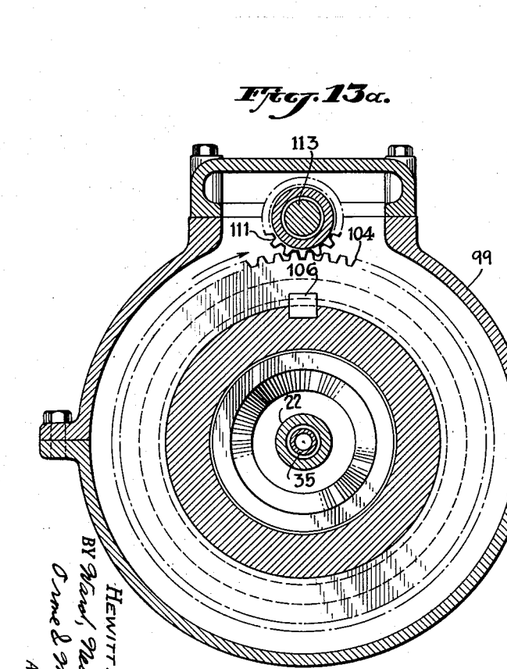

Referring to Fig. 12, the driven shaft 2 is bolted by means of bolts 95 to a sleeve 96, the sleeve 96 being connected at its opposite end to the driving shaft 97 by bolts 98. Accordingly, the sleeve 96 rotates with the shaft 97 and causes the shaft 2 to rotate therewith. The sleeve 96 is surrounded by a gear box housing 99 which is fixed rigidly in the ship and cannot be moved in any direction by the shafts 2 and 97 due to thrust bearing clearance, thermal expansion or other reasons which might cause these shafts to move, change their dimensions or twist. The sleeve 96 is rotatable and can move axially in a pair of bearings 100 and 101. Seals 102 and 103 are provided to prevent the leakage of lubricating oils from the bearings 100 and 101.

Helical gears 104 and 105 are mounted on the sleeve 96, and gear 104 is keyed to the sleeve 96 by means of a key 106 causing it to rotate therewith but also permitting the sleeve 96 and key 106 to move axially with respect to gear 104 as illustrated in Fig. 14. Gear 105 rotates with sleeve 96, as hereinafter explained, but gear 105 is also free to rotate to a limited extent with respect to the sleeve 96. Gear 104 is held between faces 107 and 108 of the housing 99 and gear 105 is held between faces 109 and 110 of the housing 99. Accordingly, the gears 104 and 105 are held against movement in the direction of the axes of these gears and of the sleeve 96.

A pair of joined pinions 111 and 112 are mounted on a shaft 113 held at its ends by the housing 99. A pair of bearings 114 and 115 are provided intermediate the pinions 111 and 112 and the shaft 113 permitting the pinions 111 and 112 to rotate on the shaft 113 and to move axially with respect thereto. The teeth of the gear 104 engage the teeth of the pinion 111 and cause it to rotate when the sleeve 96 is rotated by the shaft 97. Rotation of pinion 111 causes rotation of pinion 112, and since the teeth of pinion 112 are in engagement with the teeth of the gear 105, the gear 105 also rotates. Since the gears 104 and 105 are helical gears and since the pinions 111 and 112 are mating pinions, axial movement of the pinions 111 and 112 will cause the gear 105 to rotate with respect to the gear 104 and with respect to the sleeve 96. This rotation of the gear 105 may be as much as twice the helix angle of the gears due to he helix angles of pinions 111 and 112 being opposite and is employed as hereinafter described to control the setting of the pilot valve.

To cause the pinions 111 and 112 to move axially, the connecting portion of the pinions 111 and 112 is encircled by a bearing 116 mounted on yoke 117, the yoke 117 having a threaded hole 118 therein through which extends a screw 119. The screw 119 may be rotated manually or it may be rotated by means of a reversible motor 120 coupled thereto by coupler 120a. Thus, as the screw 119 is rotated, the yoke 117 moves in a direction dependent on the direction of rotation of screw 119 and causes the pinions 111 and 112 to move axially of the shaft 113, thereby causing the gear 105 to rotate with respect to the gear 104.

A pilot valve sleeve member 121 similar to pilot valve sleeve member 55 shown in Figs. 6 and 8 is mounted within the sleeve 96 and is movable angularly with respect thereto. The sleeve member 121 encloses a further sleeve member 122 which is similar to the pilot valve member 56 also shown in Figs. 6 and 8. The member 122 is connected either to shaft 22 of the embodiment shown in Figs. 1–5, to the shaft 22c shown in the embodiment of Fig. 9, or to the shaft 22d shown in Fig. 17 by means of shaft portion 22e which may be connected or integral with shafts 22, 22c or 22d, the member 122 being secured to the end of the shaft 22e by means of bolts 123 so as to turn therewith. In the manner previously described, the inner end of tube 35 is rotatably engaged with the member 122.

The sleeve member 121 may be turned with respect to the sleeve 96 by means of a pin 124 secured thereto, the pin 124 passing through an arcuate slot 125 (Figs. 12 and 13) in the sleeve 96. Thus, the pin 124 and the sleeve 121 may be rotated or turned with respect to the sleeve 96 by an amount limited by the length of the slot 125. The end of the pin 124 fits into a slot or groove 126 in the inner wall of the gear 105 so that when the gear 105 is rotated with respect to the sleeve 96 the sleeve 121 is caused to rotate therewith. However, due to the fact that the end of the pin 124 fits within a slot 126, the sleeve 121, the pin 124 and the sleeve 96 may move longitudinally or axially without affecting the position of the gear 105 and without causing rotation of the sleeve 121. Accordingly, longitudinal movement of the sleeve 96 due to thrust bearing clearance or to thermal expansion or contraction of the shafts 2 or 97, or to axial or torsional deflection of the parts under load or movement of the shafts 22, 22a, 22c or 22d due either to looseness or to thermal expansion or contraction, will not affect the angular setting of the sleeve 121.

The inner surface of the sleeve member 121 is provided with arcuate channels 127 and 128 (Figs. 12 and 13) which are in communication respectively with the annular channels 129 and 130 through ducts 131 and 132. Fluid under pressure is supplied through the ducts 133 and 134 and fluid is removed from the system through ducts 135 and 136, ducts 133 and 134 being in communication with fluid intake channel 137 and ducts 135 and 136 being in communication with fluid offtake channel 138. In the position shown in Fig. 12 fluid is supplied under pressure from a source (not shown) to the proper chambers within the cylinders 21 or 21a in the manner previously described, through the channel 137, ducts 133 and 134, channel 129, duct 131, channel 127, duct 139 and sleeve 122, and thence through the annular passageway surrounding the tube 35. In the same setting of the parts indicated in Fig. 12 a duct 140 in the member 122 connects the interior of the tube 35 to the offtake chanel 138 through the ducts and channels 128, 130, 132 and 136, whereby fluid under pressure may flow out from the chambers within cylinders 21 or 21a as previously described. As long as the setting of the gear 105 remains the same with respect to gear 104 and sleeve 96, the flow of operating fluid under pressure will continue until the shaft portion 22e and the member 122 have twisted sufficiently with respect to the enclosing sleeve member 121 to shut off the further flow of operating fluid through the member 122.

When it is desired to change the pitch of the propeller blades from the value to which they are set when the pilot valve parts are in the positions shown in Fig. 12, the motor 120 is operated causing rotation of screw 119, initial movement of collar 117 and pinions 111 and 112, and hence causing turning of gear 105 with respect to sleeve 96. When the gear 105 turns, it turns the sleeve 121 causing the channels 127 and 128 to communicate again with the ducts 139 and 140 or, if pitch is to be reversed, to communicate with different ducts in the member 122. The reverse setting of the sleeve member 121 is shown in Fig. 15 and in this setting the channels 127 and 128 communicate with ducts 141 and 142 in the member 122. Thus, in this position fluid under pressure is supplied from the channel 127 to duct 141 and thence through the tube 35. The fluid is removed from the annular passageway around the tube 35 through the duct 142 and the channel 128. In this manner, the flow of fluid is reversed causing the shaft 22 or 22a to move in a reverse direction with respect to the cylinder 21 or 21a and hence causing reverse turning of the propeller blades. At the same time, the member 122 will be turned by the shaft 22 or 22a and the adjustment of the pitch of the propeller blades will continue until the member 122 turns sufficiently with respect to sleeve member 121 to shut off a further flow of operating fluid into the duct 141. Thus, as described in connection with Figs. 6–8, the pitch adjustment remains fixed as long as the sleeve 121 is maintained in a fixed angular position, but whenever the angular position of the sleeve 121 is changed the pitch of the propeller blades is proportionately increased or decreased or reversed as determined by the new position to which the sleeve member 121 is shifted. However, it is important to note that because of the construction previously described the angular position of the sleeve 121 is unaffected by axial or longitudinal movement of the shafts 2 and 97, the shafts 22, 22a, 22c or 22d or the tube 35.

The foregoing embodiments of the invention are satisfactory for most purposes. However, referring to Fig. 12, it will be seen that if the shaft 2 twists under load so that the end thereof which is connected to the sleeve 96 is rotated slightly with respect to the end thereof which is connected to the propeller housing, the sleeve 96 will be turned by a similar amount with respect to the sleeve member 121 because the shaft which drives member 121 is relatively lightly loaded and will not have a similar amount of twist. Turning of the sleeve 96 with respect to the sleeve member 121 has, of course, the same effect as turning of the sleeve member 121 with respect to sleeve 96 and, therefore, the pitch of the propeller blades will be changed by such twisting of the shaft 2. In order to avoid this changing of the pitch of the blades due to twisting of the shaft 2, the pilot valve apparatus shown in Fig. 16 may be employed. As shown in this figure, the tube 35a is made somewhat heavier than the tube 35 described in the previous figures and is secured at its end by bolts 123 to the member 122 so that the member 122 rotates with the tube 35a. Thus, the turning of the member 122 is caused by the tube 35a which is connected as described in the preceding figures to the cylinder 21 or 21a. For this reason, the angular position of the member 122 is still determined by the position to which the propeller blades are turned, but it will be noted that since the tube 35a is required to turn only the member 122, there will be substantially no twisting of the tube 35a.

Figure 16:
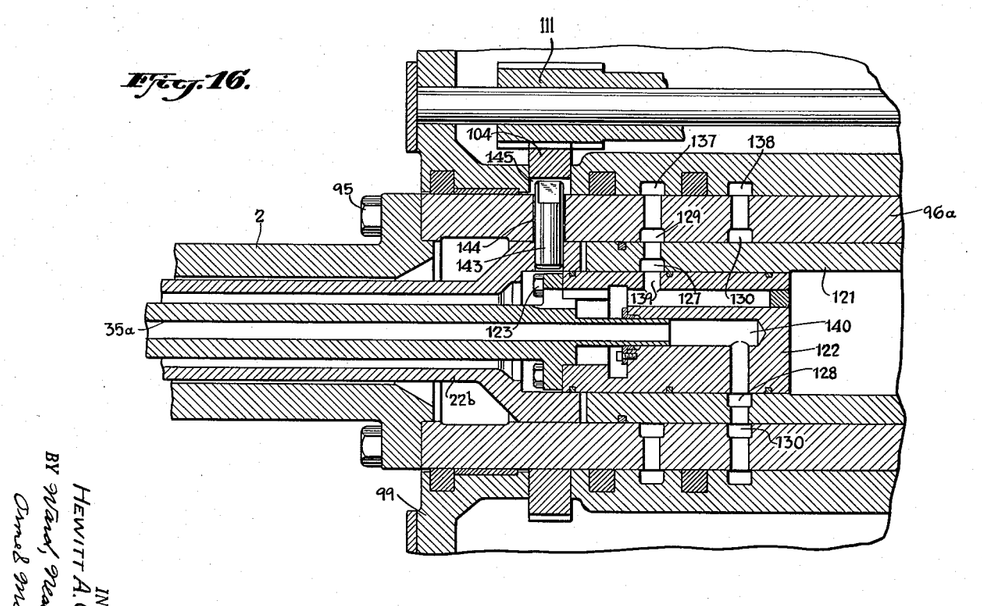
Fig. 16 is a longitudinal, partial section illustrating a modification of the apparatus shown in Fig. 12.

The shaft portion 22b shown in Fig. 16 corresponds to shaft portion 22e and may be connected to or integral with shaft 22c if manual pitch control is not desired or with shaft 22d if it is desired, but, instead of being connected to rotate the member 122, it is free to turn with respect thereto and with respect to the sleeves 121 and 96a. The end of the shaft portion 22b carries a pin 143 which extends through an arcuate slot 144 in the sleeve 96a, the end of the pin 143 fitting within a slot 145 in the gear 104. The slot 145 corresponds to the keyway into which the key 106 was inserted. With this arrangement the gear 104 which is lightly loaded is driven by the shaft portion 22b rather than by the sleeve 96a, the gear 104 being rotatable to a limited extent around the sleeve 96a.

The shaft portion 22b is driven by shaft 22c (Fig. 9) directly if manual pitch control is not desired or through intermediate shaft 22d (Fig. 17) if manual pitch control is desired, and both of the shafts 22c and 22d are free to rotate with respect to shaft 2 except for the engagement of spline teeth 162 on shaft 22c with the mating teeth 163 on shaft 2. Thus, twisting, due to load or other reasons, of the end of shaft 2 having the teeth 163 relative to the end thereof connected to sleeve 96a will not produce a corresponding rotation of gear 104 and hence sleeve 121. Accordingly, twisting of the shaft 2 will not cause the pitch of the propeller blades to change and the pitch will remain as set by the pilot valve control mechanism.

Figure 17:
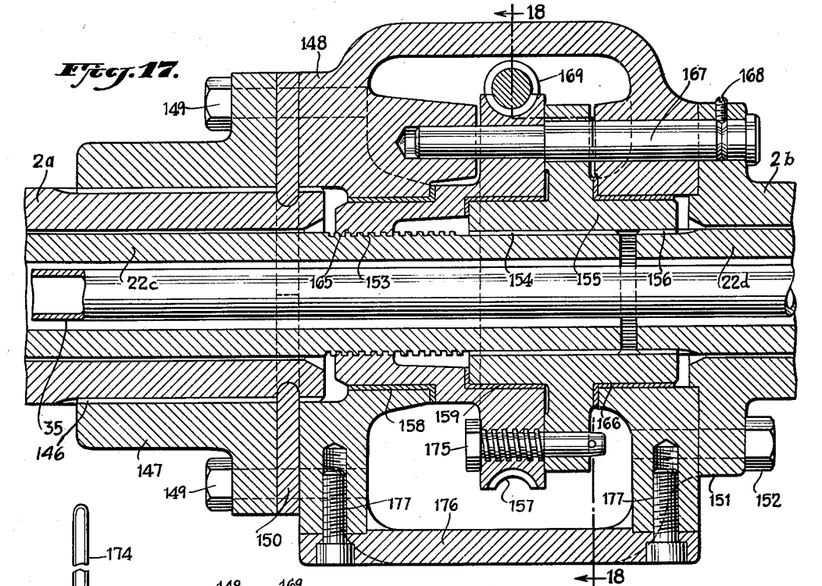
Fig. 17 is a longitudinal section illustrating manual pitch control apparatus which may be used, in the event of failure of the hydraulic control apparatus, to set the propeller pitch manually.
Figure 18:
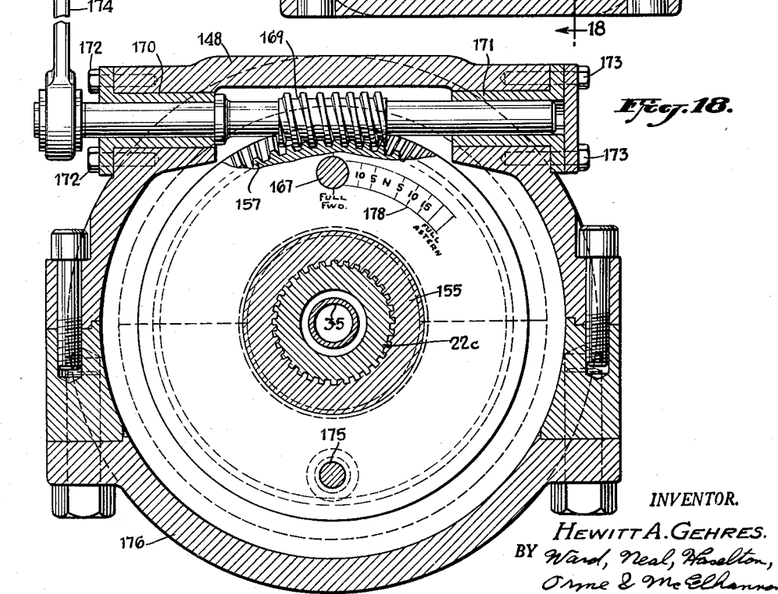
Fig. 18 is a sectional view of the apparatus shown in Fig. 17 and is taken along line 18—18 indicated in Fig. 17.

As mentioned above, the hydraulic system employed for controlling the pitch of the propeller blades may fail for some reason and when this occurs it is desirable that the pitch of the propeller blades be controllable manually. Accordingly, the preferred embodiment of the invention includes the manual pitch control apparatus shown in Figs. 17 and 18. The apparatus shown in Figs. 17 and 18 is connected intermediate the pilot valve apparatus and the housing for the propeller pitch control mechanism and for this purpose the driving shaft 2 comprises two sections 2a and 2b. One end of section 2a is provided with spline teeth 146 which engage with mating teeth on the interior wall of collar 147 which is secured to the split housing 148 by means of bolts 149. Longitudinal movement of the shaft section 2a with respect to the housing 148 and the collar 147 is prevented by means of a split ring 150 which is held between the collar 147 and the housing 148 and which fits into an annular groove in the end of the shaft section 2a. The end of the shaft section 2b which is secured to the housing 148 is provided with a flange 151 which is bolted to the housing 148 such as by bolts 152.

Shaft 22c has a threaded portion 153 and a portion 154 having spline teeth thereon which mate with teeth on a coupling member 155. The spline teeth on the coupling member 155 also engages spline teeth 156 on the end of intermediate shaft 22d. Accordingly, any rotation of the shaft 22c also causes the intermediate shaft 22d to rotate and in normal operation the shafts 22c and 22d act as a single integral shaft. However, the shaft 22c is also axially slidable in the coupling member 155 so that the end of the shaft 22c shown in Fig. 9 may be moved from the position shown in Fig. 9 to a position in which the spline teeth 162 engage the spline teeth 164 of the member 91.

For the purpose of moving shaft 22c in an axial direction and for the purpose of rotating shaft 22c when it is in such a position that the teeth 162 engage the teeth 164, a worm wheel or gear 157 is provided. This gear 157 is rotatable in bearing 158 mounted on the housing 148 and in a bearing 159 mounted on coupling member 155. Gear 157 also has a threaded portion 165 which engages the threaded portion 153 on the shaft 22c. Coupling member 155 is rotatable in a bearing 166 mounted on the housing 148.

A pin 167 held in place by a set screw 168 is provided for holding gear 157 in fixed relation to coupling member 155 and for holding both gear 157 and coupling member 155 in a fixed position with respect to the housing 148. However, the pin 167 is normally removed from the position shown in Fig. 17 and is inserted only during emergency operation and after the pitch of the propeller blades has been set manually.

The manual pitch control apparatus is also provided with a worm 169 which also is removed during normal or hydraulic operation of the pitch control mechanism and is inserted as shown in Figs. 17 and 18 only when it is desired to adjust the pitch at the propeller blades manually. In addition, after the pitch has been manually set and the pin 167 has been inserted, it is possible to remove the worm 169, the pitch of the propeller blades being maintained at full forward pitch by the pin 167. The worm 169 is rotatable in bearings 170 and 171 which are secured to the housing 148 such as by bolts 172 and 173, bearing 170 being removed when removing or inserting worm 169. The worm 169 is rotatable manually by means of a handle 174.

Assuming that the apparatus has been in normal operation and that the pitch of the propeller blades has been under the control of the hydraulic system, the parts of the manual control apparatus will be in the positions shown in Figs. 17 and 18 except that the pin 167 and the worm 169 have previously been removed. The gear 157 is prevented from rotating with respect to the coupling member 155 by the threaded pin 175 which is threaded into the gear 157 and which extends through a hole in the coupling member 155. Threaded pin 175 is first removed to permit rotation of gear 157 with respect to shaft 22c and with respect to coupling member 155. Access to the pin 175 is provided by removing cover 176 which is held on the housing 148 by bolts 177. The worm 169 is inserted by removing bearing 170, inserting and turning the worm 169 and then replacing bearing 170. After the worm 169 has been inserted and is in the position shown in Fig. 18, the worm 169 is turned by means of the handle 174 causing the gear 157 to rotate and by means of the threaded portions 153 and 165 causing the shaft 22c to move axially. When the shaft 22c has moved axially a distance sufficient to disengage the teeth 162 from the teeth 163 and to engage the teeth 162 with the teeth 164, rotation of the worm 169 is stopped. Pin 175 is then reinserted causing coupling member 155 to rotate if gear 157 is further rotated and preventing further axial movement of the shaft 22c.

Accordingly, after the pin 175 has been reinserted and, if desired at this time, the cover 176 replaced, the worm 169 is again rotated by means of the handle 174 causing the gear 157, the coupling member 155 and the shafts 22c and 22d to rotate. Rotation of the shaft 22c in its last-mentioned position causes rotation of the member 91 and hence causes the pitch of the propeller blades to change in the manner previously described in connection with the hydraulically-operated pitch control mechanism.

By observing the indicia 178 on the face of the coupling member 155 through the hole in the housing 148 through which the pin 167 is insertable as the gear 157 is rotated by the worm 169, an indication of the pitch of the propeller blades can be obtained. When the coupling member 155 is rotated to such a position that the propeller blades have their full forward pitch, holes in the coupling member 155 and the gear 157 become aligned with the hole in the housing 148 through which the pin 167 is insertable. Therefore, at this time the pin 167 is inserted and occupies the position shown in Fig. 17. The pin 167 maintains the gear 157 and the coupling member 155 and hence the shaft 22c in the positions to which they have been set manually for providing full forward pitch of the propeller blades. Accordingly, after removal of the handle 174, rotation of the driving shaft sections 2a and 2b and hence of the propeller housing and propeller can be resumed. If desired, prior to resumption of the rotation of the driving shaft, the worm 169 may be removed by first removing the bearing 170.

When the hydraulic system is again in operation so that the pitch of the propeller blades may be controlled by the hydraulic control mechanism previously described, the manual pitch control apparatus may be returned to its normal position in an obvious manner.

While the invention has been disclosed as applied to a propeller pitch adjusting mechanism of the above described specific form, it should be understood that changes may be made therein without departing from the invention in its broader aspects, within the scope of the appended claims.

I claim:

1. Propeller pitch control mechanism of the character described, including a propeller blade adjusting member having means for connecting a propeller blade thereto, said member being mounted to move about an axis directed substantially radially with respect to the axis of rotation of said propeller, fluid operated motor means connected to said adjusting member for rotating said member, fluid supply means connected to said motor means, a pilot valve mechanism connected to said fluid supply means for controlling the flow of fluid therein, said valve mechanism comprising a pair of valve sleeves, both of said sleeves being rotatable with said propeller and being rotatable with respect to each other about an axis substantially parallel to the axis of rotation of said propeller and one of said sleeves having a duct therein in communication with a fluid supply duct, the other of said sleeves having a duct in communication with said fluid supply means and said one sleeve being rotatable into a position in which said duct therein communicates with said duct in said other sleeve whereby fluid is permitted to flow to and operate said motor means, means for adjusting said one sleeve to said position, and means connecting said other sleeve to said motor means for rotation thereby whereby said duct in said other sleeve is moved out of communication with said duct in said one sleeve to thereby terminate the flow of fluid to said motor means.

2. Propeller pitch control mechanism of the character described, including a housing rotatable with the propeller shaft structure, a propeller blade adjusting member provided with means for connecting a propeller blade thereto and mounted to move angularly with respect to said housing about an axis directed substantially radially with respect to the axis of rotation of the housing, to thereby alter the pitch of the propeller, said mechanism having a chamber and means for supplying fluid under pressure to said chamber and withdrawing same therefrom, said chamber having vane members extending longitudinally with respect to the propeller shaft structure and mounted to afford relative angular movement between said vane members about an axis directed longitudinally with respect to the propeller shaft structure, in response to changes in fluid pressure in said chamber, and means coupling at least one of said vane members to said propeller adjusting member to move the latter angularly as aforesaid, in response to relative angular movement between said vane members as aforesaid, said means for supplying fluid to said chamber comprising a rotatable fluid supply line connected to one of said vane members for rotation therewith, a pair of rotatable valve members connected in said line for controlling the flow of fluid in said line, one of said valve members being adjustable by an operator and having a duct therein communicating with a fluid supply duct and the other of said valve members having a duct therein which communicates with said duct in said one valve member and with said supply line in predetermined related positions of said valve members and said other valve member being coupled to said supply line for rotation thereby out of said positions.

3. Propeller pitch control mechanism comprising a propeller blade adjusting member having means for connecting a propeller blade thereto, means for rotating said member about the axis of rotation of said propeller, said member being connected to said rotating means and being mounted to move about an axis directed substantially radially with respect to the axis of rotation of said propeller, fluid-operated motor means having a movable member connected to said adjusting member for turning said member, a pair of fluid conveying lines connected to said motor means, and a pilot valve mechanism connected to said lines for controlling the flow of fluid therein, said pilot valve mechanism comprising a fluid intake duct and a fluid offtake duct, a pair of sleeves rotatable by said rotating means and rotatable with respect to each other about the axis of rotation of said propeller, means connecting one of said sleeves to said movable member of said motor means for rotation thereby, said one sleeve having a first pair of spaced ducts communicating with one of said fluid lines and a second pair of spaced ducts communicating with the other of said fluid lines and the other of said sleeves having means which in a first position of said other sleeve connects one of said first pair of ducts with said fluid intake duct and connects one of said second pair of ducts with said fluid offtake duct and which in a second position of said other sleeve connects the other of said second pair of ducts with said fluid intake duct and connects the other of said first pair of ducts with said fluid offtake duct, and an adjusting member mounted in engagement with said other sleeve for turning said other sleeve with respect to said one sleeve and from said first position to said second position and vice versa.

4. Propeller pitch control mechanism comprising a propeller blade adjusting member having means for connecting a propeller blade thereto, means for rotating said member about the axis of rotation of said propeller, said member being connected to said rotating means and being mounted to move about an axis directed substantially radially with respect to the axis of rotation of said propeller, fluid-operated motor means having a movable member connected to said adjusting member for turning said member, a pair of fluid conveying lines connected to said motor means, one of said lines being rotatable by said movable member and a pilot valve mechanism connected to said lines for controlling the flow of fluid therein, said pilot valve mechanism comprising a fluid intake duct and a fluid offtake duct, a pair of sleeves rotatable by said rotating means and rotatable with respect thereto and with respect to each other about the axis of rotation of said propeller, one of said sleeves being mounted within the other, means connecting the inner one of said sleeves to said one fluid line for rotation thereby, said inner sleeve having a first pair of spaced ducts communicating with one of said fluid lines and a second pair of spaced ducts communicating with the other of said fluid lines and the outer one of said sleeves having a pair of spaced ducts which in a first position of said outer sleeve communicate respectively with one of said first pair of ducts and said fluid intake duct and with one of said second pair of ducts and said fluid offtake duct, said ducts in said outer sleeve in a second position of said outer sleeve communicating respectively with the other of said second pair of ducts and said fluid intake duct and with the other of said first pair of ducts and said fluid offtake duct, and an adjusting member mounted in engagement with said outer sleeve for turning said outer sleeve with respect to said inner sleeve and from said first position to said second position and vice versa.

5. Propeller pitch control mechanism comprising a propeller blade adjusting member having means for connecting a propeller blade thereto, means for rotating said member about the axis of rotation of said propeller, said member being connected to said rotating means and being mounted to move about an axis directed substantially radially with respect to the axis of rotation of said propeller, fluid-operated motor means rotatable by said rotating means and having a pair of movable members connected to said adjusting member for turning said member, a pair of fluid conveying lines connected to said motor means, a pilot valve mechanism connected to said lines for controlling the flow of fluid therein, said pilot valve mechanism comprising a fluid intake duct, a pair of valve members movable with respect to each other means connecting one of said valve members to one of said movable members of said motor means for rotation thereby, said one valve member having a first duct communicating with one of said fluid lines and a second duct communicating with the other of said fluid lines and the other of said valve members having means which in a first position of said other valve member connects said first duct with said fluid intake duct and which in a second position of said other valve member connects said second duct with said fluid intake duct, a first helical gear connected to the other of said movable members of said motor means for rotation thereby and therewith, a second helical gear connected to said other valve member for moving said other valve member with respect to said one valve member, and helical pinion means interconnecting said first and second gears, said pinion means being axially movable for turning said second gear with respect to said first gear for thereby moving said other valve member with respect to said one valve member.

6. Propeller pitch control mechanism comprising a propeller blade adjusting member having means for connecting a propeller blade thereto, means for rotating said member about the axis of rotation of said propeller, said member being connected to said rotating means and being mounted to move about an axis directed substantially radially with respect to the axis of rotation of said propeller, fluid-operated motor means rotatable by said rotating means and having a movable member connected to said adjusting member for turning said member, a pair of fluid conveying lines connected to said motor means, a pilot valve mechanism connected to said lines for controlling the flow of fluid therein, said pilot valve mechanism comprising a fluid intake duct, a pair of valve members movable with respect to each other, means connecting one of said valve members to said movable member of said motor means for rotation thereby, said one valve member having a first duct communicating with one of said fluid lines and a second duct communicating with the other of said fluid lines and the other of said valve members having means which in a first position of said other valve member connects said first duct with said fluid intake duct and which in a second position of said other valve member connects said second duct with said fluid intake duct, a first helical gear connected to said rotating means for rotation thereby, a second helical gear connected to said other valve member for moving said other valve member with respect to said one valve member, and helical pinion means interconnecting said first and second gears, said pinion means being axially movable for turning said second gear with respect to said first gear for thereby moving said other valve member with respect to said one valve member.

7. Propeller pitch control mechanism comprising a propeller blade adjusting member having means for connecting a propeller blade thereto, means for rotating said member about the axis of rotation of said propeller, said member being connected to said rotating means and being mounted to move about an axis directed substantially radially with respect to the axis of rotation of said propeller, fluid-operated motor means rotatable by said rotating means and having a movable member connected to said adjusting member for turning said member, a pair of fluid conveying lines connected to said motor means, a pilot valve mechanism connected to said lines for controlling the flow of fluid therein, said pilot valve mechanism comprising a fluid intake duct, a pair of valve members movable with respect to each other, means connecting one of said valve members to said movable member of said motor means for rotation thereby, said one valve member having a first duct communicating with one of said fluid lines and a second duct communicating with the other of said fluid lines and the other of said valve members having means which in a first position of said other valve member connects said first duct with said fluid intake duct and which in a second position of said other valve member connects said second duct with said fluid intake duct, a first helical gear connected to the portion of said rotating means adjacent said adjusting member for rotation thereby, a second helical gear connected to said other valve member for moving said other valve member with respect to said one valve member, and helical pinion means interconnecting said first and second gears, said pinion means being axially movable for turning said second gear with respect to said first gear for thereby moving said other valve member with respect to said one valve member.

8. Propeller pitch control mechanism comprising a propeller blade adjusting member having means for connecting a propeller blade thereto, means for rotating said member about the axis of rotation of said propeller, said member being connected to said rotating means and being mounted to move about an axis directed substantially radially with respect to the axis of rotation of said propeller, fluid-operated motor means rotatable by said rotating means and having a pair of movable members connected to said adjustable member for turning said member, a pair of fluid conveying lines connected to said motor means, a pilot valve mechanism connected to said lines for controlling the flow of fluid therein, said pilot valve mechanism comprising a fluid intake duct and a fluid offtake duct, a pair of sleeves rotatable with respect to each other, one of said sleeves being mounted within the other, means connecting the inner one of said sleeves to one of said movable members of said motor means for rotation thereby, said inner sleeve having a first pair of spaced ducts communicating with one of said fluid lines and a second pair of spaced ducts communicating with the other of said fluid lines and the outer one of said sleeves having means which in a first position of said outer sleeve connects one of said first pair of ducts with said fluid intake duct and connects one of said second pair of ducts with said fluid offtake duct and which in a second position of said outer sleeve connects the other of said second pair of ducts with said fluid intake duct and connects the other of said first pair of ducts to said fluid offtake duct, a first helical gear connected to the other of said movable members of said motor means for rotation thereby and therewith, a second helical gear connected to said outer sleeve for rotating said outer sleeve, and helical pinion means interconnecting said first and second gears, said pinion means being axially movable for turning one of said gears with respect to the other.

9. Propeller pitch control mechanism comprising a propeller blade adjusting member having means for connecting a propeller blade thereto, means for rotating said member about the axis of rotation of said propeller, said member being connected to said rotating means and being mounted to move about an axis directed substantially radially with respect to the axis of rotation of said propeller, fluid-operated motor means rotatable by said rotating means and having a movable member connected to said adjusting member for turning said member, a pair of fluid conveying lines connected to said motor means, a pilot valve mechanism connected to said lines for controlling the flow of fluid therein, said pilot valve mechanism comprising a fluid intake duct and a fluid offtake duct, a pair of sleeves rotatable with respect to each other, one of said sleeves being mounted within the other, means connecting the inner one of said sleeves to said movable member of said motor means for rotation thereby, said inner sleeve having a first pair of spaced ducts communicating with one of said fluid lines and a second pair of spaced ducts communicating with the other of said fluid lines and the outer one of said sleeves having means which in a first position of said outer sleeve connects one of said first pair of ducts with said fluid intake duct and connects one of said second pair of ducts with said fluid offtake duct and which in a second position of said outer sleeve connects the other of said second pair of ducts with said fluid intake duct and connects the other of said first pair of ducts to said fluid offtake duct, a first helical gear connected to said rotating means for rotation thereby, a second helical gear connected to said outer sleeve for rotating said outer sleeve, and helical pinion means interconnecting said first and second gears, said pinion means being axially movable for turning one of said gears with respect to the other.

10. Propeller pitch control mechanism comprising a propeller blade adjusting member having means for connecting a propeller blade thereto, means for rotating said member about the axis of rotation of said propeller, said member being connected to said rotating means and being mounted to move about an axis directed substantially radially with respect to the axis of rotation of said propeller, fluid-operated motor means roatable by said rotating means and having a movable member connected to said adjusting member for turning said member, a pair of fluid conveying lines connected to said motor means, a pilot valve mechanism connected to said lines for controlling the flow of fluid therein, said pilot valve mechanism comprising a fluid intake duct and a fluid offtake duct, a pair of sleeves rotatable with respect to each other, one of said sleeves being mounted within the other, means connecting the inner one of said sleeves to said movable member of said motor means for rotation thereby, said inner sleeve having a first pair of spaced ducts communicating with one of said fluid lines and a second pair of spaced ducts communicating with the other of said fluid lines and the outer one of said sleeves having means which in a first position of said outer sleeve connects one of said first pair of ducts with said fluid intake duct and connects one of said second pair of ducts with said fluid offtake duct and which in a second position of said outer sleeve connects the other of said second pair of ducts with said fluid intake duct and connects the other of said first pair of ducts to said fluid offtake duct, a first helical gear connected to the portion of said rotating means adjacent said adjusting member for rotation thereby, a second helical gear connected to said outer sleeve for rotating said outer sleeve, and helical pinion means interconnecting said first and second gears, said pinion means being axially movable for turning one of said gears with respect to the other.

11. Propeller pitch control mechanism comprising propeller rotating means including a propeller driving shaft and a housing connected to and rotatable with said shaft, a propeller blade adjusting member mounted in said housing and having means for connecting a propeller blade thereto, fluid operated motor means within said housing and connected to said member for rotating said member with respect to said housing, a fluid supply system for supplying fluid under pressure to said motor means, said system having a valve for controlling the supply of fluid to said motor means and said valve having a control member, first and second control shaft sections mounted within said driving shaft, said first section being axially slidable and having a first portion coupled in one axial position with said rotating means at said housing for rotation therewith and in a second axial position with said adjusting member for rotation thereof, said second section being connected to said control member for movement thereof, a coupling member rotatably coupling said sections and mounted for rotation with respect to said driving shaft, and manually operable means engageable with said first section for moving said first section axially and for rotating said first section.

12. Propeller pitch control mechanism comprising a tubular propeller driving shaft, a housing connected to and rotatable with said shaft, a propeller blade adjusting member mounted in said housing and having means for connecting a propeller blade thereto, fluid operated motor means within said housing and connected to said member for rotating said member with respect to said housing, a fluid supply system for supplying fluid under pressure to said motor means, said system having a valve for controlling the supply of fluid to said motor means and said valve having a control member, first and second control shaft sections mounted within said driving shaft, said first section being axially slidable and having a first portion connectable in one axial position with said shaft adjacent said housing for rotation therewith and in a second axial position with said adjusting member for rotation thereof, said first section also having a threaded second portion spaced from said first portion and said second section being connected to said control member for movement thereof, a coupling member rotatably interconnecting said sections and mounted for rotation with respect to said driving shaft, a worm gear mounted for rotation with respect to said driving shaft, a worm engageable with said worm gear for rotation of the latter, said worm gear having a threaded portion in engagement with said second portion of said first shaft section for causing axial movement of said first section upon rotation of said gear with respect to said driving shaft, and releasable means for interconnecting said gear and said coupling member and for thereby causing said coupling member and said first section to rotate with said gear.

13. Propeller pitch control mechanism comprising a tubular propeller driving shaft, a housing connected to and rotatable with said shaft, a propeller blade adjusting member mounted in said housing and having means for connecting a propeller blade thereto, fluid operated motor means within said housing and connected to said member for rotating said member with respect to said housing, a fluid supply system for supplying fluid under pressure to said motor means, said system having a valve for controlling the supply of fluid to said motor means and having a rigid supply line mounted within said shaft, said valve having a pair of control members and said line being connected to said motor means for movement thereby and to one of said control members for movement thereof, first and second control shaft sections mounted within said driving shaft, said first section being axially slidable and having a first portion connectable in one axial position with said shaft adjacent said housing for rotation therewith and in a second axial position with said adjusting member for rotation thereof, said first section also having a threaded second portion spaced from said first portion and said second section being connected to the other of said control members for movement thereof, a coupling member rotatably interconnecting said sections and mounted for rotation with respect to said driving shaft, a worm gear mounted for rotation with respect to said driving shaft, a worm engageable with said worm gear for rotation of the latter, said worm gear having a threaded portion in engagement with said second portion of said first shaft section for causing axial movement of said first section upon rotation of said gear with respect to said driving shaft, and releasable pin means for interconnecting said gear and said coupling member and for thereby causing said coupling member and said first section to rotate with said gear.

References Cited in the file of this patent

UNITED STATES PATENTS

| | | |
|---|---|---|
| 2,276,347 | Ruths et al. | Mar. 17, 1942 |
| 2,308,488 | Caldwell et al. | Jan. 19, 1943 |
| 2,355,039 | Eves | Aug. 1, 1944 |
| 2,441,838 | Obrist | May 18, 1948 |
| 2,456,361 | Atteslander | Dec. 14, 1948 |
| 2,513,546 | Atteslander | July 4, 1950 |
| 2,536,565 | Ostergren | Jan. 2, 1951 |
| 2,661,807 | Fielding | Dec. 8, 1953 |
| 2,686,569 | Bruce | Aug. 17, 1954 |
| 2,745,502 | Gehres | May 15, 1956 |